United States Patent [19]

Bock et al.

[11] Patent Number: 4,963,632
[45] Date of Patent: Oct. 16, 1990

[54] MIXED MICELLAR PROCESS FOR PREPARING HYDROPHOBICALLY ASSOCIATING POLYMERS

[75] Inventors: Jan Bock, Bridgewater; Paul L. Valint, Asbury, both of N.J.

[73] Assignee: Exxon Research and Engineering Company, Florham Park, N.J.

[21] Appl. No.: 291,803

[22] Filed: Dec. 29, 1988

[51] Int. Cl.$^5$ ............................................. C08F 30/04
[52] U.S. Cl. ................................. 526/240; 526/307.2
[58] Field of Search ............................ 526/240, 307.2

[56]  References Cited
U.S. PATENT DOCUMENTS

| | | | |
|---|---|---|---|
| 4,237,253 | 12/1980 | Jacquet et al. | 526/240 |
| 4,309,523 | 1/1982 | Engelhardt et al. | 526/240 |
| 4,526,947 | 7/1985 | Castner | 526/240 |
| 4,584,358 | 4/1986 | McCormick et al. | 526/240 |
| 4,592,850 | 6/1986 | Castner | 526/240 |
| 4,599,390 | 7/1986 | Fan et al. | 526/240 |
| 4,736,005 | 4/1988 | Castner | 526/240 |

FOREIGN PATENT DOCUMENTS

| | | | |
|---|---|---|---|
| 0044508 | 1/1982 | European Pat. Off. | 526/240 |
| 0079071 | 5/1983 | European Pat. Off. | 526/240 |
| 3404491 | 8/1985 | Fed. Rep. of Germany | 526/240 |
| 60-001210 | 1/1985 | Japan | 526/240 |
| 60-168706 | 9/1985 | Japan . | |
| 215504 | 6/1968 | U.S.S.R. | 526/240 |

OTHER PUBLICATIONS

"A Method of Producing Polymers & Copolymers of Amido-Sulfonic Acid . . . ", Sopko et al. CA107(6):40597j; '87.

Primary Examiner—Joseph L. Schofer
Assistant Examiner—N. Sarofim
Attorney, Agent, or Firm—Richard E. Nanfeldt

[57] ABSTRACT

A homogeneous micellar free radical polymerization process for the formation of a terpolymer having the structure of:

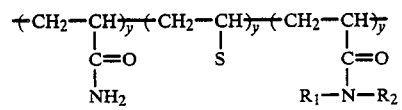

wherein S is selected from the group consisting of $SO_3M$, phenyl $SO_3M$, $CONHC(CH_3)_2CH_2SO_3M$ or $COOM$; M is selected from the group consisting of Groups IA, IB, IIA and IIB of the Periodic Table of Elements, $R_1$ is a $C_1$ to $C_{10}$ alkyl, cycloalkyl or aralkyl group, $R_2$ is hydrogen or a $C_4$ to $C_{18}$ alkyl, cycloalkyl or aralkyl group, x is about 10 to about 90 mole %, y is about 0.1 to about 60 mole %, and z is about 0.2 to about 10 mole % which comprises the steps of forming a mixture of an anionic surfactant, a nonionic surfactant,

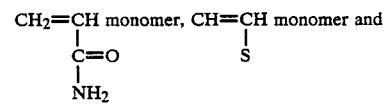

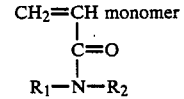

under a nitrogen atmosphere; adding deoxygenated water to said mixture to form a homogeneous reaction solution; adding free radical initiator to said homogeneous reaction solution to initiate polymerization of said monomers; terpolymerizing said monomers at a sufficient temperature and for a sufficient period of time to form said terpolymer and without the formation of substantial amounts of particulates or phase separation occurring.

9 Claims, No Drawings

MIXED MICELLAR PROCESS FOR PREPARING HYDROPHOBICALLY ASSOCIATING POLYMERS

FIELD OF THE INVENTION

This invention relates to a novel process for preparing hydrophobically associating co and terpolymers. These high molecular weight water soluble polymers contain both water soluble and water insoluble or hydrophobic monomers. The water soluble monomers are acrylamide (AM) and optionally, a salt of an ethylenically unsaturated sulfonic acid (S) or a metal acrylate or n-vinyl-pyrrolidinone and the water insoluble monomer is a higher alkyl acrylamide (R). The process for polymerization of these monomers relies on solubilizing the water insoluble monomer into an aqueous micellar solution containing two or more surfactants and the water soluble monomers. The surfactants are specifically selected to enable homogeneous dispersion of the hydrophobic monomer(s) in the presence of the water soluble monomers. In addition, one surfactant is selected from a class of nonionic surfactants while the other surfactant is selected from a class of anionic surfactants such that the incorporation of the hydrophobic monomer is uniform throughout the course of the reaction. Redox or free radical initiators are used to copolymerize both the water soluble and water insoluble monomers forming co or terpolymers of ethylenically unsaturated sulfonic acids or carboxylic acids, acrylamide and alkyl acrylamides. Aqueous solutions of the hydrophobically associating polymers prepared by the process of this invention are more readily prepared and exhibit enhanced viscosification, reduced salt sensitivity and other desirable rheological properties found useful in a variety of applications.

DESCRIPTION OF THE PRIOR ART

Polyacrylamide (PAM) and partially hydrolyzed polyacrylamide (HPAM) are well known water soluble polymers used as flocculation aids for waste water treatment and dewatering sludge, and for rheology control for secondary or tertiary oil recovery. Further examples of the properties and use of these polymers can be found in *Handbook of Water Soluble Gums and Resins*, R. L. Davidson, Ed., McGraw Hill 1980, Chapter 16 by H. Volk and R. E. Friedrich or in *Water-Soluble Polymers*, N. M. Bikales. Ed., Plenum Press, 1973, by D. C. MacWilliams, J. H. Rogers and T. J. West. Polyacrylamides rely on a combination of high molecular weight and chain expansion due to repulsion of pendent ionic groups along the polymer chain to viscosify or thicken aqueous fluids. However, high molecular weight polymers mechanically degrade when subjected to large elongational or shear stresses such as found in pumps or during injection into reservoir rocks. This degradation results in permanent reduction in polymer molecular weight and in turn loss of viscosification efficiency. The presence of cations in aqueous solution, in particular divalent cations, shields the ionic charged groups on the polymer. This causes the polymer chains to collapse into a random coil type configuration, losing significant viscosification efficiency. Thus polymeric viscosifiers based on an alternative mechanism of viscosification providing improved mechanical stability and salt tolerance relative to PAM and HPAM polymers would be highly desirable.

Water soluble copolymers of acrylamide and sulfonated monomers have been studied as aqueous fluid viscosifiers. For example, C. L. McCormick and G. S. Chen, J. of Polymer Science: Polymer Chemistry Ed., Vol. 20, 817–838 (1982) describe the synthesis and characterization of random copolymers of acrylamide and sulfonated monomers such as sodium-2-sulfoethyl methacrylate or sodium-2-acrylamido-2-methylpropane sulfonate. In a recent paper on the dilute solution properties of these polymers, H. H. Neidlinger, G. S. Chen and C. L. McCormick, J. of Applied Polymer Science, Vol. 29, 713–730 (1984) noted the high salt sensitivity of these polymers, particularly for copolymer compositions containing more than about 25 mole percent sulfonate monomer. U.S. Pat. No. 4,342,653 teaches the use of random copolymers of acrylamide and AMPS for the flocculation of suspended solids in such aqueous systems as phosphate slime, uranium acid leach residue, etc.

Processes for preparing polyacrylamides are well known in the art; Tanaka et al., U.S. Pat. No. 4,154,910 teaches an aqueous solution method using the heat of polymerization to concentrate the product. Zimmermann et al., U.S. Pat. No. 3,211,708 teaches an oil-in-water bead polymerization for polymerizing water soluble monomers. These techniques result in moderate molecular weight polymers exhibiting poor viscosification efficiency particularly in saline solutions. Kolodny, U.S. Pat. No. 3,002,960 teaches a low temperature, redox initiated solution polymerization resulting in high molecular weight polyacrylamide. Another approach to high molecular weight water soluble polymers is described by J. W. Vanderhoff et al., U.S. Pat. No. 3,284,393, where water soluble monomers are polymerized at high concentration in a water-in-oil emulsion. While some of these processes allow high molecular weight polymers to be prepared, the resulting polyacrylamide, PAM, and partially hydrolyzed polyacrylamide, HPAM, and copolymers of acrylamide and sulfonated monomer, SAM, systems provide only fair viscosification efficiency, poor mechanical stability and low salt tolerance.

One approach to overcoming the deficiencies in these polyacrylamide based systems is described by Bock et al., U.S. Pat. No. 4,520,182. Water soluble acrylamide copolymers containing a small amount of oil soluble or hydrophobic alkyl acrylamide groups were found to impart efficient viscosification to aqueous fluids. Furthermore since these alkyl acrylamide- acrylamide copolymers (RAM) were nonionic, they were relatively insensitive to the level of salt in the water. However, these polymers required concentrations above about 2000 ppm to provide significant viscosification. Landoll, U.S. Pat. No. 4,304,902 describes copolymers of ethylene oxide with long chain epoxides which also required relatively large polymer concentration (approx. 1%) for thickening water and required surfactants for solubility due to irregularities in the polymerization. In a related case, U.S. Pat. No. 4,428,277, modified nonionic cellulose ether polymers are described. Although these polymers show enhanced viscosification relative to polymers not containing hydrophobic groups, the viscosification efficiency was very low requiring 2 to 3 weight percent polymer to provide an enhancement. The use of surfactants to enable solubility and in turn viscosification by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive as well as very sensitive to small changes in surfactant and polymer concentration. Emmons et al., U.S. Pat. No. 4,395,524 teaches acrylamide copolymers as thickeners for aqueous systems. While these polymers possess hydrophobic groups, they are prepared using alcohol containing solvents which are known chain transfer agents. The resulting polymers having rather low molecular weights and thus relatively high polymer concentrations are required to achieve reasonable viscosification of water based fluids.

One of the objects of this invention is to overcome the deficiencies in the use of the water soluble polymers of the prior art for thickening aqueous fluids. A new class of water soluble polymer will be described which have improved solubility characteristics and impart enhanced viscosification to aqueous fluids, improved mechanical stability and better salt tolerance. These new polymers contain a nonionic water soluble monomer such as acrylamide, optionally an anionically charged water soluble ethylenically unsaturated sulfonate or carboxylate monomer, such as an alkali metal salt of a vinyl alkylsulfonic acid or acrylic acid and a water insoluble or hydrophobic monomer such as an alkyl acrylamide with a chain length of six carbons or greater. When these polymers are placed in an aqueous solvent, the hydrophobic groups aggregate or associate in a manner similar to a surfactant. This hydrophobic association between polymer chains in solution results in an increase in the hydrodynamic size of the molecule which in turn causes an increase in viscosity. We have found that the presence of ionic groups, such as sodium 2-acrylamido-2-methylpropane sulfonate, AMPS, cause an expansion of the polymer in solution, an improvement in polymer solubility and a favorable interaction with the hydrophobic groups. Thus polymers containing both ionic sulfonate groups and hydrophobic groups provide a significant improvement in viscosification efficiency of water based systems.

The prime objective of this invention is the synthesis of the hydrophobically associating polymers in which the hydrophobic monomer is incorporated within the polymer chain in a uniform and homogeneous manner. This presents many synthetic challenges. In order for polymerization to be effected, the monomers must obviously come into close proximity to one another. The incompatibility of the oil soluble and water soluble monomers prevents an effective concentration of one or the other of these monomeric species from being achieved at the locus of polymerization of the other comonomer. Thus a major objective of this invention is to teach a method for preparing the novel sulfonate containing hydrophobically associating polymers. A variety of processes based upon prior art could conceivably achieve this, but have serious deficiencies, necessitating the instant invention. For example, simply dispersing the water insoluble monomer as fine particles in the aqueous medium containing dissolved water soluble monomers would result in low incorporation of the water insoluble monomer and would lead to a heterogeneous product of particles dispersed in a predominantly water soluble polymer. The resulting polymer could not be used to impart efficient and uniform thickening to water based fluids.

Techniques for polymerizing water soluble polymers such as those taught in U.S. Pat. Nos. 4,154,190, 3,211,708, 3,002,960 and 3,284,393 cannot be used to prepare the desired polymers. This art does not teach the formation of a sufficiently fine dispersion of the water and oil soluble monomers to enable uniform reaction and efficient aqueous viscosifiers to be prepared. The use of mutual solvents or solvent mixtures to dissolve the water and oil soluble monomers as taught by Lenke et al., U.S. Pat. No. 4,151,333 and Barua et al., U.S. Pat. No. 4,098,987 has some serious limitations. Although this approach undoubtedly allows the incompatible monomers to come into close proximity to one another, since the dispersion is on a molecular scale, often the resulting copolymer is insoluble in the same solvent as shown in U.S. Pat. No. 4,151,333. This leads to precipitation of the copolymer before it has achieved sufficient molecular weight to provide efficient aqueous viscosification. The use of water miscible solvents such as alcohols, ether and acetone either alone or with water as taught in U.S. Pat. No. 4,098,987 results in extremely low molecular weight (e.g. 10,000) polymers due to the high chain transfer characteristics of these solvents. Thus polymers produced by these teachings are rather ineffective viscosifiers for aqueous fluids.

Two techniques have been found most useful for preparing hydrophobically associating copolymers of acrylamide and alkyl acrylamides. The first method was based on the use of a water continuous microemulsion to disperse the oil soluble monomer in a solution of the water soluble monomers. Details of the procedures and techniques are taught by Turner et al. in U.S. Pat. No. 4,521,580. A second method for preparing copolymers of acrylamide and alkylacrylamide was based on dispersing the oil soluble monomers using an aqueous micellar solution of the water soluble monomers. Suitable surfactants and the details of the polymerization are taught by Turner et al. in U.S. Pat. No. 4,528,348. While either the microemulsion or micellar polymerization techniques can be used to prepare hydrophobically associating polymers containing a variety of water soluble nonionic monomers, a problem arises when the monomers have a strong interaction with the surfactants used in the polymerization. In particular, strong ionic interactions or complexes can be formed between anionic water soluble monomers such as ethylenically unsaturated alkyl sulfonates and cationic surfactants such as quaternary alkyl amines. A second problem is that the incorporation of the hydrophobic monomer does not appear to be uniform throughout the course of the reaction. This results in a very heterogeneous product with some polymer molecules containing much more hydrophobe than others. The instant invention teaches a process for obtaining homogenous incorporation of the monomers into the polymers which was not readily attainable with the prior inventions.

An approach to the control of the rheological properties of water based fluids involves the use of "hydrophobically associating polymers". We use this term to describe synthetically derived, water soluble polymers containing a small amount of oil soluble or hydrophobic groups. When these polymers are dissolved in aqueous solution, the hydrophobic groups aggregate to minimize their exposure to water, in a fashion analogous to that of surfactants above the critical micelle concentration. Therefore, in aqueous solution, hydrophobic associations can strongly influence polymer conformations and, in turn, solution rheological properties. In addition, the incorporation of hydrophobic groups on a water soluble polymer backbone provides a new means for controlling interactions with the solvent, solids, oils, surfactants and microemulsions. The consequences of these interactions are enhanced viscosification, altered response to salts, flocculation of suspended solids and oil as well as improved compatibility with microemulsions.

SUMMARY OF THE INVENTION

This invention describes a process for making novel hydrophobically associating co and terpolymer compositions optionally, containing sulfonate monomers. The polymers consist of a water soluble nonionic monomer such as acrylamide, optionally a water soluble anionic monomer such as a sulfonate (e.g. sodium 2-acrylamide-2-methylpropane sulfonate) or carboxylate monomer or a nonionic monomer such as n-vinyl-pyrrolidinone or dimethyl acrylamide, and an oil soluble hydrophobic alkylacrylamide monomer. These copolymers or terpolymers provide efficient viscosification of water or brine solutions. The anionic carboxylate or sulfonate groups improve polymer solubility in water and brine, particularly in the presence of salts containing divalent cations, and impart some chain stiffness due to charge repulsion, particularly in water containing a low electrolyte concentration. The hydrophobic N-alkylacrylamide groups associate in solution to create a structure with an apparent increase in molecular weight resulting in enhanced thickening efficiency. Thus the anionic sulfonate or carboxylate groups and hydrophobic groups are balanced to provide water and brine solubility along with excellent thickening efficiency. In addition, aqueous fluids thickened with the polymer compositions prepared by the process of this invention, have improved mechanical stability, when subjected to high shear, and better salt tolerance relative to polymers relying on molecular weight in place of the hydrophobic associations for viscosification.

DETAILED DESCRIPTION OF THE INVENTION

The present invention describes a process for making novel co- and terpolymers consisting of a nonionic, water soluble, ethylenically unsaturated monomer such as acrylamide or optionally dimethylacrylamide or n-vinyl-pyrrolidinone; optionally, an anionic water soluble ethylenically unsaturated alkylsulfonate monomer or metal acrylate, such as salts of 2-acrylamido-2-methylpropane sulfonate or acrylic acid respectively; and a water insoluble monomer, such as an alkylacrylamide. The resulting copolymers or terpolymers are efficient viscosifiers of water and brine. The water soluble hydrophobically associating polymers prepared by the process of the instant invention are characterized by the formula:

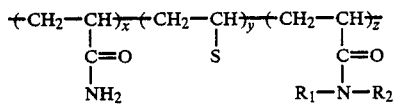

wherein S is $SO_3M$, phenyl$SO_3M$, $CONHC(CH_3)_2CH_2SO_3M$ $COOM$; $R_1$ is a $C_1$ to $C_{10}$ alkyl, cycloalkyl or aralkyl group; $R_2$ is hydrogen, a $C_4$ to $C_{18}$ alkyl, cycloalkyl or aralkyl group; x is about 10 mole percent to about 99 mole percent; y is 0 to about 70 mole percent and z is about 0.2 to about 10 mole percent, wherein M is a metal cation selected from the group consisting of Groups IA, IB, IIA and IIB of the Periodic Table of Elements. Typical, but nonlimiting examples of preferred cations are sodium, potassium and ammonium. The mole percentage of acrylamide, x, is preferably about 10 to about 99, more preferably about 20 to about 95, and most preferably about 30 to about 95. The mole percentage of the salt of the sulfonate containing monomer, metal acrylate or n-vinyl pyrrolidinone, y, is preferably about 0 to about 70, more preferably about 0.1 to about 60, and most preferably about 0.5 to about 50. The mole percentage of the hydrophobic group, z, is preferably about 0.2 to about 10, more preferably about 0.3 to about 5, and most preferably about 0.4 to about 0.3.

The molecular weight of the water soluble co and terpolymers from the process of this invention is sufficiently high that they are efficient viscosifiers of water or brine, but not so high that the polymer molecules are readily susceptible to irreversible shear degradation. Thus the weight average molecular weights are preferably about 200,000 to about 10 million, more preferably about 500,000 to about 8 million and most preferably about 1 million to about 7 million. The intrinsic viscosity of these polymers as measured in 2% sodium chloride solution is preferably greater than about 1 dl/g.

The hydrophobically associating co and terpolymers are prepared by the novel mixed micellar free radical polymerization process of this invention. The process comprises the steps of forming a mixed micellar surfactant solution of the oil soluble or hydrophobic alkyl acrylamide in an aqueous solution of acrylamide; deaerating this solution by purging with nitrogen or additionally applying a vacuum; raising the temperature to the desired reaction temperature; adding sufficient free radical initiator to the reaction solution; and polymerizing for a sufficient period of time at a sufficient temperature to effect polymerization. The resulting terpolymer of acrylamide, a salt of an ethylenically unsaturated alkyl or aryl sulfonic acid metal, acrylate or n-vinylpyrrolidinone and a hydrophobic N-alkylacrylamide can be isolated from the reaction mixture by any of a variety of techniques which are well know to one skilled in the art. For example the polymer may be recovered by precipitation using a nonsolvent such as acetone, methanol, isopropanol or mixtures thereof. The precipitated polymer can then be washed and oven dried to provide a product in the form of a free flowing powder. Alternatively the polymer solution may be used as is by diluting with the desired aqueous solvent to the concentration of use.

The process for synthesizing these co and terpolymers relies on solubilizing the water insoluble monomers into a predominantly aqueous media by the use of a specific blend of ionic and nonionic surfactants. When mixed with an aqueous solution of the water soluble ethylenically unsaturated monomers, the surfactant blend solution can disperse the water insoluble monomer on an extremely fine scale so that the reaction mixture is isotropic, clear, and homogeneous. These micellar reaction mixtures are free of visible oil droplets or particulates of the water insoluble monomer. The terpolymerization can, therefore, be initiated by water soluble initiators to yield co- and terpolymers which are substantially free of visible particulates. The resultant reaction mixture remains homogeneous throughout the course of the reaction without the need for agitation with external mixers or stirrers.

The process of the instant invention enables the preparation of hydrophobically associating water soluble polymers with a compositionally uniform distribution of the hydrophobic monomer, a so-called random distribution. The hydrophobically associating water soluble polymers are comprised of both nonionic water soluble and water insoluble or hydrophobic monomers. The nonionic water soluble monomers are exemplified by acrylamide and the hydrophobic monomers are higher alkylacrylamides or alkylarylacrylamides such as N-1-octylacrylamide and N-4-butylphenylacrylamide.

Synthesis of high molecular weight random copolymers of acrylamide and alkylacrylamides required a novel aqueous surfactant micellar solution polymerization because of the mutual immiscibility of the water soluble and hydrophobic monomers. The use of a surfactant blend provided solubilization of the hydrophobic monomer (alkylacrylamide - R) into the aqueous phase containing the water soluble monomer (acrylamide - AM).

The process of the present invention is based on solubilization of the water insoluble monomer into an aqueous micellar solution consisting of a specific blend of ionic and noionic surfactants such that the resulting copolymer made under these conditions is compositionally homogeneous. Compositionally homogeneous refers to the uniform incorporation of hydrophobic monomer into the polymer molecule throughout the course of the polymerization reaction.

The incorporation of hydrophobic monomer into a copolymer consisting of the hydrophobic monomer and a water soluble monomer, such as acrylamide was unexpectedly found to be dependent upon the surfactant composition used to solubilize the hydrophobic monomer into aqueous polymerization medium. The data for hydrophobic monomer incorporation with different surfactant types using N-4-(1-butyl)phenyl-acrylamide as the hydrophobic monomer illustrates the advantage of the process of this invention.

Micelles formed by the surfactant blend which solubilize the water insoluble monomer are generally small aggregates which consist on the order of 50 to 200 molecules. They may assume a variety of shapes from spherical to rod-like or cylindrical and generally are in the size range from about 20 Angstoms to 500 Angstroms in diameter. These micelles form spontaneously upon mixing the components together, i.e., they do not require the vigorous mixing conditions required in conventional emulsion polymerization in which macroemulsions are formed. The macroemulsion droplets of the conventional emulsion polymerization process have diameters which are at least 10,000 Angstroms. They therefore tend to phase separate upon standing, leading to undesirable inhomogeneities in the produced copolymer. The homogeneous micellar reaction mixture is, on the other hand, much more stable against demixing than the formulations used in emulsion polymerization processes. Indeed, no stirring is required during the course of the micellar copolymerization. The micellar aggregates remain extremely finely dispersed throughout. Moreover, the finely dispersed nature of the micellar aggregates permit the terpolymerization to occur in such a way that a water soluble terpolymer is produced which does not contain particulates or latexes of water insoluble polymers. These would be detrimental in such applications as secondary oil recovery, which requires a product which is substantially free of pore plugging particulates.

The surfactants which may be used in this process are mixtures of one or more anionic surfactants in combination with one or more nonionic surfactants. The anionic surfactants are preferably water soluble and are selected from salts of alkyl sulfates, sulfonates and carboxylates or alkyl arene sulfates, sulfonates or carboxylates or sulfates of alkoxylated alcohols. Preferred are sodium or potassium salts of decyl sulfate, dodecyl sulfate or tetradecylsulfate. For these ionic surfactants, the Krafft point, which is defined as the minimum temperature for micelle formation, must be below the temperature used for the polymerization. Thus at the conditions of polymerization, the desired surfactant will form micelles which solubilize the water insoluble monomer.

The nonionic surfactants which comprise the second component (nonionic surfactant) of the surfactant blend can be selected from the group consisting of alkoxylated alcohols, alkoxylated alkyl phenols, alkoxylated dialkyl phenols, ethylene oxide-propylene oxide copolymers and polyoxyethylene alkyl ethers and esters. Preferred nonionic surfactants are ethoxylated nonyl phenol with 5 to 20 ethylene oxide units per molecule, ethoxylated dinonyl phenol containing 5 to 40 ethylene oxide units per molecule and ethoxylated octyl phenol with 5 to 15 ethylene oxide units per molecule. Surfactants which contain both nonionic and anionic functionality, e.g. sulfates and sulfonates of ethoxylated alcohols and alkyl phenols can also be used.

The surfactant or mixtures of surfactants will be used at concentrations above their critical micelle concentration and preferably at concentrations such that only one hydrophobic monomer is associated with a surfactant micelle. Thus the actual concentration of surfactant for a given polymerization will depend on the concentration of oil soluble or hydrophobic monomers employed. The relative amount of the anionic and nonionic components of the surfactant blend will depend on the chemical composition of the hydrophobic group as well as the specific anionic and nonionic surfactant used. In general, the ratio of anionic to nonionic surfactant will vary from 20:1 to 1:20, preferrably from 10:1 to 1:10, and most preferably from 5:1 to 1:5.

We have found that combinations of anionic and nonionic surfactants selected from the above groups can be used in the mixed micellar polymerization process of this invention to produce a more homogeneous hydrophobically associating polymer composition. This means that the amount of hydrophobic monomer is more uniform both within and between polymer chains. This type of polymer has improved solubility in aqueous solutions and imparts more uniform and controllable rheological properties.

Polymerization of the water soluble and water insoluble monomers is effected in an aqueous mixed micellar solution containing a suitable free radical initiator. Examples of suitable water soluble free radical initiators include peroxides such as hydrogen peroxide and persulfates such as sodium, potassium or ammonium persulfate. The concentration of the free radical initiator is about 0.01 to about 0.5 grams per hundred grams of total monomers. Suitable oil soluble initiators are organic peroxides and azo compounds such as azobisisobutyronitrile. Water soluble initiators are preferred such as potassium persulfate. Redox initiation involving an oxidant such as potassium persulfate and a reductant such as sodium metabisulfite can also be used to initiate polymerization, particularly at low temperatures. Polymerizing at lower temperature results in the formation of higher molecular weight polymers which are desirable from the standpoint of efficient aqueous viscosification. Typically it is desired to employ from about 0.01 to about 0.5 weight percent of initiator based on the weight of monomers. The polymerization temperature is preferably about 0° C. to about 90° C., more preferably about 20° C. to about 80° C. and most preferably about 25° C. to about 70° C.

The hydrophobically associating co and terpolymer compositions produced by the micellar polymerization process of this invention have been found useful for thickening aqueous fluids. To prepare these thickened fluids, an amount of the co or terpolymer thickening agent is dissolved in the aqueous fluid by agitation using any of a number of techniques well known in the art. For example a marine impellor operating at relatively low speed can be used to first disperse and then dissolve these hydrophobically associating polymers. It is desirable to use relatively low agitation conditions, since these polymers have a tendency to cause and stabilize foams which can be difficult to break. The aqueous solutions may be distilled water, high concentrations of electrolyte in water such as in hard water or brine. Monovalent inorganic salts such as sodium chloride and divalent salts such as calcium or magnesium chloride or sulfate can be present in the brine in substantial amounts. A preferred method for preparing the thickened brine solutions involves first preparing a concentrated solution of the polymer in relatively fresh water and then adding a concentrated brine solution to obtain the desired final thickened brine solution. The amount of polymeric thickening agent needed to produce a desired level of viscosification will depend on the composition of the electrolytes in the aqueous fluid and the temperature. In general, more polymer will be required as the electrolyte concentration increases and as the temperature increases. Viscosification of about 2 to about 100 times or more that of the neat solvent can readily be achieved with the terpolymers prepared by the process of this invention. Preferably about 0.01 to about 2.0 weight percent, more preferably about 0.05 to about 1.0 weight percent and most preferably about 0.1 to about 0.5 weight percent polymer based on the aqueous medium will provide the desired level of thickening efficiency.

The thickening efficiency of a given polymer is influenced by the amount of anionically charged sulfonate groups, the level and type of hydrophobic groups and the weight average molecular weight. The addition of the anionic sulfonate groups improves polymer solubility and enhances thickening efficiency due to repulsion of charges along the backbone which tends to open the polymer coil and increase hydrodynamic volume. The hydrophobic groups decrease polymer solubility and associate in solution to physically bridge polymer molecules creating greater resistance for flow and hence increased viscosity. The more insoluble the hydrophobic group is in the solvent, the less that is needed to create the associations in solution. For example, less dodecylacrylamide is needed in a polymer to create the same viscosification as a larger amount of octyl acrylamide in a similar polymer. In addition it is possible to have too much association, in which case the polymer becomes insoluble in the solvent and cannot be used as a viscosifier. Fortunately, the solubility characteristics of the sulfonate and hydrophobic groups are opposite one another and thus the addition of more sulfonate monomer can be used to counterbalance the addition of hydrophobic groups. Increasing both sulfonate and hydrophobic groups can result in a synergistic enhancement of thickening efficiency.

Molecular weight of the polymer is also an important consideration. High molecular weight polymers incorporating both anionically charged sulfonate groups and hydrophobic groups can provide significantly improved viscosification of water based fluids. All other things being equal, the higher the molecular weight, the less soluble the polymer. Thus as molecular weight is increased, the amount of hydrophobic groups should be reduced and the amount of sulfonate groups increased. It is desirable that the resulting polymer in an aqueous solution not be susceptible to irreversible mechanical degradation under shear. This places an upper limit on the molecular weight of about 10 million. Control of molecular weight is achieved by the concentration of monomers, the type and level of initiator and the reaction temperature. As is well known in the art, the molecular weight is increased by increasing the monomers level and decreasing the initiator level and reaction temperature.

DESCRIPTION OF THE PREFERRED EMBODIMENTS

The following examples illustrate the present invention without, however, limiting the same hereto.

Example I

N-4-Alkylphenylamides

The preparation of the various N-alkylacrylamides and model propionamides used is exemplified by the following procedure for N-ethylphenylacrylamide.

Freshly distilled 4-ethylaniline, 20.0 g (0.16 moles), and 300 mL of ether were added to a 1 L flask and cooled to $-10°$ C. Triethylamine, 18.3 g (0.18 moles), dissolved in 100 mL of ether, was added followed by slow addition of 16.3 g, 0.18 moles, of acryloyl chloride dissolved in 100 mL of ether. The mixture was allowed to warm to room temperature.

After 18 hrs., 250 mL of 10% HCl was added. The two phase solution was separated and the ether layer was washed with 500 mL each of 10% $NaHCO_3$ and saturated NaCl. The ether solution was dried and evaporated under vacuum. The residue was recrystallized twice from a hexane/acetone solution to give 15.9 g (57%) of desired product with a melting point of 108° C. Infrared and nmr spectra of this product and all other analogs were consistent with the structures of the desired compounds.

Example II

Polymerization of N-4-Butylphenylacrylamide-Acrylamide in 1% Sodium Dodecylsulfate A solution of 10 g of sodium dodecylsulfate in 1 L of deoxygenated water was prepared. N-4-Butylphenylacrylamide, 0.843 g, was dissolved in this solution followed by 29.6 g of acrylamide. The resulting solution was carefully transferred to a 2 L Morton style resin kettle fitted with a chilled water condenser, thermometer, inert gas sparger and mechanical stirrer. The temperature was adjusted to 50° C. and polymerization was initiated by the addition of 0.0208 g of $K_2S_2O_8$. After stirring for 20 min at 50° C., a 300 mL portion of the solution was poured slowly into 3 L of methanol. After 60 min reaction time, a 200 mL aliquot was taken followed by two 100 mL aliquots at 90 and 120 min, respectively. All polymer samples were precipitated in a similar manner. The precipitated polymer samples were then masticated in a Waring blender with methanol, filtered and dried under vacuum at 30° C. The conversion to polymer for each sample was 16, 34, 46 and 52%, respectively. After 22 hrs., the final polymer sample was obtained at a conversion of 80%.

Example III

Polymerization of N-4-Butylphenylacrylamide-Acrylamide in 2% Igepal CO-710

A solution of 30 g of Igepal CO-710 in 1.5 L of deoxygenated water was prepared. N-4-Butylphenyl-acrylamide, 1.26 g, was dissolved in this solution followed by 43.7 g of acrylamide. The resulting solution was carefully transferred to a 2 L Morton style resin kettle fitted with a chilled water condenser, thermometer, inert gas sparger and mechanical stirrer. The temperature was adjusted to 50° C. and polymerization was initiated by the addition of 0.0312 g of $K_2S_2O_8$. After stirring for 40 min at 50° C., a 800 mL portion of the solution was poured slowly into 3 L of methanol. After 70 min reaction time, a 200 mL aliquot was taken followed by two 100 mL aliquots at 100 and 130 min, respectively. All polymer samples were precipitated in a similar manner. The precipitated polymer samples were then masticated in a Waring blender with methanol, filtered and dried under vacuum at 30° C. The conversion to polymer for each sample was 0.93, 8.9, 21 and 40%, respectively. After 22 hrs., the final polymer sample was obtained at a conversion of 100%.

Example IV

Polymerization of N-4-Butylphenylacrylamide-Acrylamide in 2% Igepal CO-710 and 1% Sodium Dodecylsulfate A solution of 20 g of Igepal CO-710 and 10 g of sodium dodecylsulfate in 1 L of deoxygenated water was prepared. N-4-Butylphenylacrylamide, 0.843 g, was dissolved in this solution followed by 29.2 g of acrylamide. The resulting solution was carefully transferred to a 2 L Morton style resin kettle fitted with a chilled water condenser, thermometer, inert gas sparger and mechanical stirrer. The temperature was adjusted to 50° C. and polymerization was initiated by the addition of 0.0208 g of $K_2S_2O_8$. After stirring for 5 min at 50° C., a 300 mL portion of the solution was poured slowly into 3 L of methanol. After 30 min reaction time, a 200 mL aliquot was taken followed by two 100 mL aliquots at 60 and 120 min, respectively. All polymer samples were precipitated in a similar manner. The precipitated polymer samples were then masticated in a Waring blender with methanol, filtered and dried under vacuum at 30° C. The conversion to polymer for each sample was 19, 30, 41 and 56%, respectively. After 22 hrs., the final polymer sample was obtained at a conversion of 92%.

Example V

UV Spectral Analysis

The quantitative technique developed for the determination of the incorporation of hydrophobic monomer into a water soluble polymer was based on ultraviolet spectroscopic detection of hydrophobic monomers containing phenyl groups. The approach to obtaining quantitative information in this procedure was to provide a measure of the absorptivity of the hydrophobic monomer through the use of a model. The UV active monomer chosen as hydrophobe was N-4-(1-butyl)phenylacrylamide. N-4-(1-Butyl)-phenylpropionamide was the corresponding model compound representing the chromophoric functionality of the hydrophobe when incorporated into a polymer backbone.

Aqueous solutions of the model compound were prepared at a broad range of concentrations to determine the linearity of absorbance response to concentration. The UV absorption spectra were obtained in the range of 200 to 300 nm using a Perkin-Elmer Lambda 5 Spectrophotometer. Similarly, the polymers were measured in the same solvent as that for the model compound representing the hydrophobe of the polymer. The UV absorption of the nonhydrophobic portion of the polymer was removed from the spectra by using a polymer as the reference that was similar to the analyzed polymer but did not contain hydrophobe. The various model compounds synthesized in our laboratory are listed in Table II. The absorptivity of each model was calculated using Beer's Law and a linear regression giving an absorptivity of 69.3 $Lg^{-1}cm^{-1}$ in 3% SDS with a correlation coefficient of 0.9999.

The polymers were synthesized using the micellar polymerization technique described in Examples II-IV. The isolated polymer samples were dissolved in 3% SDS and their UV spectra were obtained. The incorporation of hydrophobic monomer into the polymers was determined by a comparison of the absorptivity of the hydrophobe unit in the polymer to the corresponding model. With the assumption that the absorptivity of the hydrophobe in the polymer is the same as that of the model, the ratio of polymer absorptivity to model gives the weight fraction of hydrophobe, $x_H$, in the polymer, equation 1. Converting $x_H$ to mole fraction and dividing by the feed content in mole percent of hydrophobic monomer, $M_f$, results in the hydrophobe incorporation. The expressions for incorporation into RAM and HRAM polymers are given by equations 2 and 3, respectively.

$$x_H = \frac{A_p}{a_M} \quad (1)$$

$$H_{inc}(\%) = \frac{X_H/MW_H}{[X_H/MWH + (1 - x_H)/MW_{AM}]M_f} \times 100 \quad (2)$$

wherin: $MW_H$ = hydrophobic unit molecular weight $MW_{AM}$ = acrylamide molecular weight or $$H_{inc}(\%) = \frac{X_H/MW_H}{[X_H/MW_H + X_{AA}/MW_{AA} + (1 - x_H - x_{AA})/MW_{AM}]M_f} \times 100 \quad (3)$$

wherein: $X_{AA}$ = weight fraction of sodium acrylate units $MW_{AA}$ = sodium acrylate molecular weight In order to insure a linear response of absorbance to concentration, the absorbance was measured at a number of polymer concentrations and the absorptivities were determined by linear regression.

Example VI

Hydrophobe Incorporation

Using the above defined techniques and polymer compositions, the incorporation of hydrophobic monomer into a copolymer consisting of the hydrophobic monomer and a water soluble monomer, such as acrylamide was unexpectedly found to be dependent upon the surfactant composition used to solubilize the hydrophobic monomer into the aqueous polymerization medium. The data for hydrophobic monomer incorporation with different surfactant types using N-4-(1-butyl)-phenyl-acrylamide as the hydrophobic monomer are given in Table I and illustrate the advantage of the process of this invention.

It is clearly shown by these data that copolymer composition can vary widely due to differences in hydrophobe incorporation as a function of conversion to polymer. Sample A, containing 1 wt % sodium dodecyl sulfate, SDS, gave a compositionally heterogeneous copolymer wherein low conversion product, i.e., <10% conversion, had a hydrophobe content of 5.0 mol % in contrast to the feed composition of 1 mol %. As conversion to polymer increased, the hydrophobe incorporation tended toward the feed composition. The incorporation data are cumulative values since samples analyzed at the various conversion levels contain representative polymer molecules produced from the beginning of the reaction. With 2 wt % Igepal CO-710, a nonylphenol ethoxylate with 10 ethylene oxide units, Sample B was also heterogeneous but in the opposite sense. Hydrophobic monomer incorporation was lower than the feed composition at low conversions, i.e., 0.25 at ~1% conversion, then gradually increased toward the feed composition. A straightforward 1:1 mixture of SDS and Igepal CO-710 (1.5 wt % of each) was not sufficient to produce a homogeneous copolymer. The 1:1 surfactant mixture was used for Sample C which had hydrophobe incorporation of 1.3 mol % at 8.4% conversion, again decreasing to the feed composition as the reaction proceeded. However, a mixture of 2 wt % Igepal CO-710 and 1 wt % SDS resulted in an essentially homogeneous copolymer composition, Sample D.

TABLE I
N-4-(1-Butyl)phenylacrylamide incorporation vs conversion as a function of surfactant composition.

| Sample | Surfactant | Conversion, % | Hydrophobe Incorporation, % |
|---|---|---|---|
| A | 1 wt % SDS | 4.7 | 5.0 |
|   |   | 27 | 2.7 |
|   |   | 40 | 2.0 |
|   |   | 59 | 1.5 |
|   |   | 71 | 0.91 |
| B | 2 wt % Igepal- | 0.93 | 0.25 |
|   |   | 8.9 | 0.26 |
|   |   | 21 | 0.30 |
|   |   | 41 | 0.43 |
|   |   | 69 | 0.71 |
| C | 1:1[a] | 8.4 | 1.3 |
|   |   | 18 | 1.2 |
|   |   | 29 | 1.1 |
|   |   | 45 | 1.1 |
|   |   | 75 | 0.91 |
| D | 2:1[b] | 21 | 1.0 |
|   |   | 27 | 0.95 |
|   |   | 38 | 0.94 |
|   |   | 67 | 0.93 |

[a] 1.5 wt % Igepal CO-710 and 1.5 wt % SDS.
[b] 2 wt % Igepal CO-710 and 1.0 wt % SDS.

What is claimed is:

1. A homogeneous micellar free radical polymerization process for the formation of a terpolymer having the structure of:

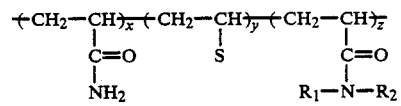

wherein S is selected from the group consisting of $SO_3M$, phenyl $SO_3M$, $CONHC(CH_3)_2 CH_2SO_3M$ or $COOM$; M is selected from the group consisting of Groups IA, IB, IIA and IIB of the Periodic Table of Elements, $R_1$ is a $C_1$ to $C_{10}$ alkyl, cycloalkyl or aralkyl group, $R_2$ is hydrogen or a $C_4$ to $C_{18}$ alkyl, cycloalkyl or aralkyl group, x is about 10 to about 90 mole %, y is about 0.1 to about 60 mole %, and z is about 0.2 to about 10 mole % which comprises the steps of (a) forming a mixture of an anionic surfactant, a nonionic surfactant,

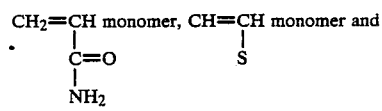

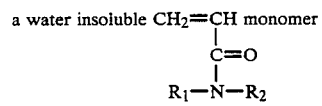

under a nitrogen atmosphere;

(b) adding deoxygenated water to said mixture to form a homogeneous reaction solution;

(c) adding free radical initiator to said homogenous reaction solution to initiate polymerization of said monomers;

(d) terpolymerizing said monomers at a sufficient temperature and for a sufficient period of time to form said terpolymer and without the formation of substantial amounts of particulates or phase separation occurring.

2. A process according to claim 1, wherein said terpolymer is water soluble.

3. A process according to claim 1 or 2 further including recovering said terpolymer from said reaction solution.

4. A process according to claim 1, wherein S is $CONHC(CH_3)_2CH_2SO_3M$.

5. A process according to claim 1 or 2 wherein $R_1$ is selected from the group consisting of hexyl, octyl, decyl, dodecyl or hexadecyl groups, and $R_2$ is selected from the same group or hydrogen.

6. A process according to claim 1 or 2 wherein said free radical initiator is selected from the group consisting of potassium; sodium thiosulfate, potassium persulfate mixture; and benzoylperoxide or other common free radical initiators.

7. A process according to claim 1 or 2 wherein said polymerization is carried out at about 0° to about 70° C. for about 1 to about 48 hours.

8. A process according to claim 1 wherein said anionic surfactant is selected from the group consisting of salts of alkyl sulfates sulfonates and carboxylates or alkyl arene sulfates, sulfonates or carboxylates or sulfates of alkyloxylated alcohols.

9. A process according to claim 1 or 8 wherein the nonionic surfactant is selected from the group consisting of alkoxylated alcohols, alkoxylated alkyl phenols, alkoxylated dialkyl phenols, ethylene oxide-propylene oxide copolymers and polyethylene alkyl ethers and esters.

* * * * *